J. R. DE FRANC.
AUTOMOBILE FENDER.
APPLICATION FILED AUG. 1, 1919.
1,361,692.
Patented Dec. 7, 1920.
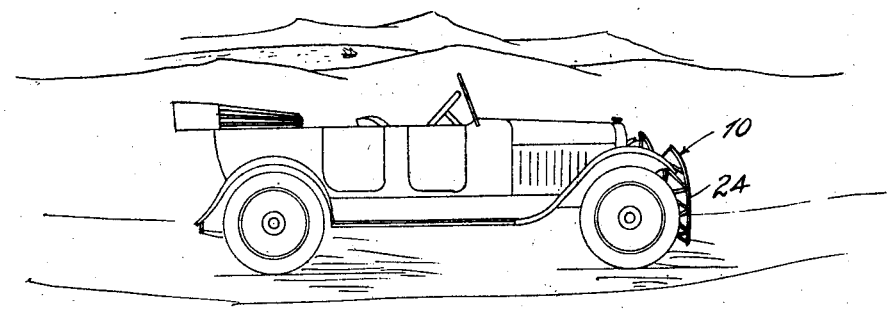
Fig. 1
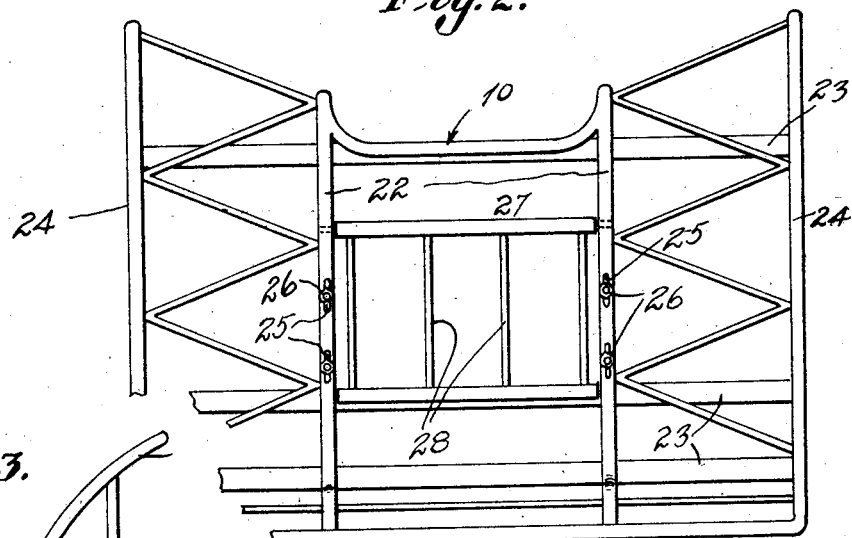
Fig. 2.
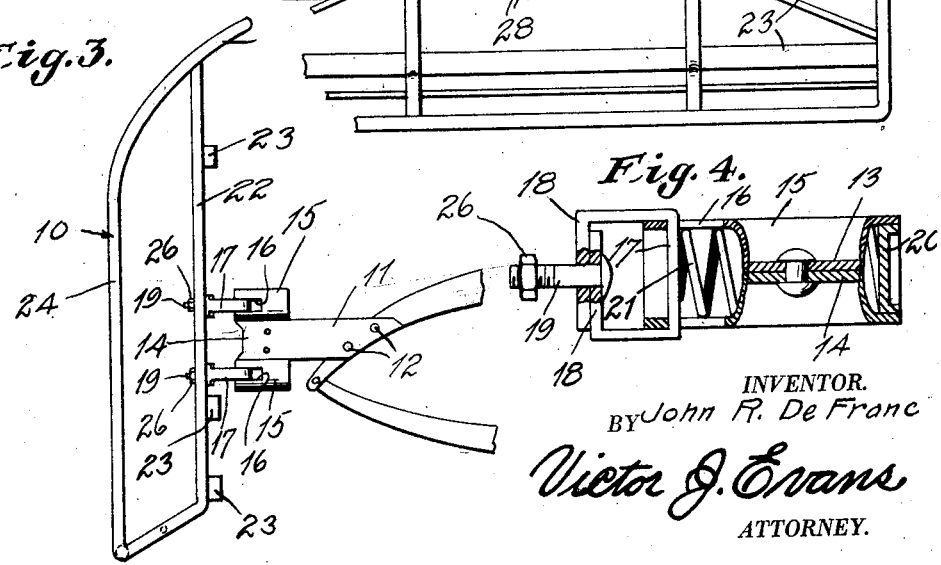
Fig. 3.
Fig. 4.
INVENTOR.
BY John R. De Franc
Victor J. Evans
ATTORNEY.

UNITED STATES PATENT OFFICE.

JOHN R. DE FRANC, OF BROOKLYN, NEW YORK.

AUTOMOBILE-FENDER.

1,361,692.   Specification of Letters Patent.   Patented Dec. 7, 1920.

Application filed August 1, 1919. Serial No. 314,666.

*To all whom it may concern:*

Be it known that I, JOHN R. DE FRANC, a citizen of the United States, residing at Brooklyn, in the county of Kings and State of New York, have invented new and useful Improvements in Automobile-Fenders, of which the following is a specification.

This invention relates to fenders for vehicles and is particularly designed for use in connection with automobiles.

The principal object of the invention resides in the provision of a fender comprising a supporting member and a protective shield, said shield being relatively adjustable with relation to its support in order to accommodate the same to vehicles of varying sizes and types.

Another object of the invention is the provision of a fender of this class which is provided with buffer means in order to absorb the shock when contacting with a person or object.

A still further object of the invention is the provision of a fender provided with means whereby access may be readily had to the crank shaft in order that the engine may be cranked.

Another object of the invention is the provision of a device of the class described which is simple in construction, inexpensive to produce and which will be ornamental in design thereby adding to the attractiveness of the vehicle.

With these and other objects in view, the invention resides in the novel construction, combination and arrangement of parts more fully described and pointed out in the following description and claim and illustrated in the drawing, in which:—

Figure 1 is a side elevation showing the fender applied to an automobile.

Fig. 2 is a front view thereof.

Fig. 3 is a side elevation of the fender, and

Fig. 4 is an enlarged fragmentary sectional detail view.

Referring to the drawing, 10 designates the fender and 11 the supporting member which is attached to a convenient part of the vehicle by means of the bolts 12. The support 11 is preferably constructed of two sections 13 and 14 which are of identical construction and are adapted to mate with each other in order to form the buffer housings 15. These housings are preferably of cylindrical formation and are provided at diametrically opposite points with the slots 16 through which the yoke 17 is passed and adapted to slide. The forward portion of the yoke is provided with inwardly bent arms 18 which are secured together by means of the bolt 19. The rear extremity of the housing is covered by means of the head 20 and a coiled spring 21 is interposed between the yoke and the head 20 as illustrated in Fig. 4 of the drawing. The fender 10 constitutes a shield which is constructed from a plurality of upright bars 22 and cross bars 23. The outermost uprights 22 have secured thereto, the curved bars 24 which prevent a pedestrian who is struck from being thrown sidewise under the vehicle. The inner uprights 22 are slotted as at 25 for the reception of the bolts 19 and locking nuts 26 are adapted to be threaded thereon to retain the shield in its adjusted positions. By this arrangement it will be noted that the shield may be raised or lowered to accommodate itself to varying heights and sizes of vehicles to which the fender is applied. A centrally arranged opening 27 is provided in the fender and a hinged door 28 is provided which normally closes the opening but can be readily opened whereby access may be had therethrough to the crank shaft for starting the motor.

In operation of the device, should a pedestrian be accidentally struck by the vehicle, the shield will prevent him from being thrown under the wheels and the side curved bars 24 will prevent him from being thrown sidewise from the machine with the liability of resulting injuries from other vehicles traveling in the same or opposite directions. At the same time, the springs 21 will tend to decrease the force of impact to an appreciable extent as the yoke 17 will move backwardly against the force of the spring which acts as a buffer.

While I have illustrated and described one preferred manner of carrying my invention into practice, I do not care to be limited to the precise details of construction shown therein but desire to have it understood that changes, and alterations which fall within the scope of the appended claim may be resorted to when desired.

What is claimed as new is:—

A fender for vehicles including a shield, and supports, said supports comprising a pair of mating sections, having mating semi-cylindrical portions constituting housings, said portions being slotted, a yoke adapted to move through the slots, a head adapted to cover one end of the housings and a buffer spring interposed between the slot and said yoke.

In testimony whereof I have affixed my signature.

JOHN R. DE FRANC.